United States Patent

[11] 3,621,030

[72] Inventor Raymond Seltzer
New York, N.Y.
[21] Appl. No. 784,919
[22] Filed Dec. 18, 1968
[45] Patented Nov. 16, 1971
[73] Assignee M&T Chemicals Inc.
New York, N.Y.

[54] NEW UREIDO DERIVATIVES OF ISOPERTHIOCYANIC ACID AND THE METHOD FOR THEIR PREPARATION
2 Claims, No Drawings
[52] U.S. Cl. .................................................. 260/306.8 R, 252/391, 252/402, 260/247, 260/345.1, 260/345.9, 260/346.1 R, 260/347.8
[51] Int. Cl. ..................................................... C07d 91/70
[50] Field of Search .......................................... 260/306.7, 306.8

[56] References Cited
OTHER REFERENCES
Wagner et al. Synthetic Organic Chemistry, John Wiloy & Sons, 1953, pp. 645– 828.

Primary Examiner—Alex Mazel
Assistant Examiner—R. J. Gallagher
Attorneys—Lewis C. Brown, Kenneth G. Wheeless and Robert P. Grindle ABSTRACT: This invention relates to heterocyclic compounds of the formula

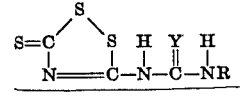

wherein Y is selected from the group consisting of oxygen and sulfur and R is a hydrocarbon, said compounds being useful as peroxide inhibitors and corrosion inhibitors.

NEW UREIDO DERIVATIVES OF ISOPERTHIOCYANIC ACID AND THE METHOD FOR THEIR PREPARATION

DERIVATIVES OF ISOPERTHIOCYANIC ACID

This invention relates to new and valuable derivatives of isoperthiocyanic acid and to a process for preparing said derivatives.

It is an object of this invention to produce novel ureido derivatives of isoperthiocyanic acid. Other objects will be apparent to those skilled in the art.

This invention relates to heterocycle compounds of the formula

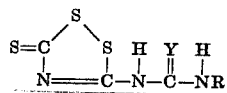

wherein Y is selected from the group consisting of oxygen and sulfur and R is a hydrocarbon.

According to another of its aspects, this invention is a novel process for preparing heterocyclic compounds of the formula

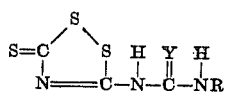

wherein Y is selected from the group consisting of oxygen and sulfur and R is a hydrocarbon, comprising reacting as reactants isoperthiocyanic acid of the formula

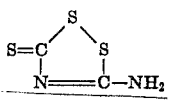

and an organic compound of the formula RNCY wherein Y is selected from the group consisting of oxygen and sulfur and separating said heterocyclic compounds.

The terms isocyanate and isothiocyanate are generally applicable to compounds containing one of more $-N=C=Y$ groups in which Y is oxygen or sulfur. Compounds of this generic definition includes monoisocyanates and monoisothiocyanates of the general formula

RNCY in which R is a hydrocarbon or substituted hydrocarbon selected from the group consisting of alkyl, cycloalkyl, alkenyl, alkynyl, aralkyl, aryl, alkaryl, and substituted analogues thereof.

In the isocyanate compound, RNCY, R may be a hydrocarbon radical preferably selected from the group consisting of alkyl, alkenyl, cycloalkyl, aralkyl, aryl, alkaryl, including such radicals when inertly substituted. When R is alkyl, it may typically be straight chain alkyl or branched alkyl, including methyl, ethyl, n-propyl, isopropyl, nH-butyl, isobutyl, sec-butyl, tert-butyl, n-amyl, neopentyl, isoamyl, n-hexyl, isohexyl, heptyls, octyls, decyls, dodecyls, tetradecyl, octadecyl. etc. Preferred alkyl includes lower alkyl, i.e. having less than about eight carbon atoms, i.e. octyls and lower. When R is alkenyl, it may typically be vinyl, allyl, 1-propenyl, methallyl buten-1-yl, buten-2-yl, buten-3-yl, penten-1-yl, hexenyl, heptenyl, octenyl, decenyl, dodecenyl, tetradecenyl, octadecenyl, etc. When R is cycloalkyl, it may typically be cyclopentyl, cyclohexyl, cycloheptyl, cyclooctyl, etc. When R is aralkyl, it may typically be benzyl, β-phenylethyl, Υ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may b inertly substituted, e.g. may bear nonreactive substituents such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Substituted alkenyls include 4-chlorobutyl, Υ-phenylpropenyl, chloroallyl, etc. Substituted cycloalkyls include 4-methylcylohexyl, 4-chlorohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

Examples of such isocyanate and isothiocyanate compounds include methyl isocyanate, ethyl isocyanate, butyl isocyanate, octyl isocyanate, octadecyl isocyanate. vinyl isocyanate, isopropenyl isocyanate, ethynyl isocyanate, benzyl isocyanate, phenyl isocyanate, vinyl phenyl isocyanate, tolyl isocyanate, ethyl isothiocyanate. and phenyl isothiocyanate, α-naphthyl isocyanate, 4-tolylene isocyanate, and n-hexyl isocyanate. Also included are polyisocyanates and polyisothiocyantes.

The isoperthiocyanic acid used in the practice of this invention is obtainable by the reaction of an ammonium or an alkali metal thiocyanate with a mineral acid, e.g. hydrochloric acid.

The process of this invention may be represented by the following equations:

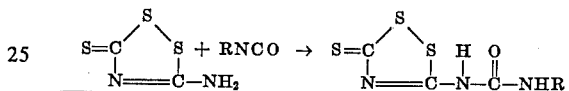

It is understood that the product of this invention may exist in the following tautomeric forms:

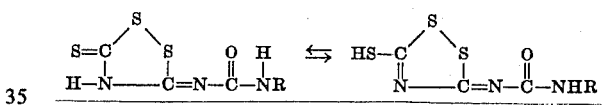

wherein R is a hydrocarbon selected from the group consisting of alkyl, cycloalkyl, alkenyl, alkynyl, aralkyl, aryl, alkaryl, and substituted analogues thereof.

In an illustrative embodiment the process of this invention comprises adding an isocyanate compound to a suspension of isoperthiocyanic acid in a suitable solvent. Thus the initial stage of the process comprising the reaction of an isocyanate with perthiocyanic acid is preferably conducted in an organic medium capable of at least partially dissolving the reactants. The nature of the solvent is not critical; any suitable organic solvent may be used. Typical solvents that may be employed include ketones such as acetone and methyl ethyl ketone; and ethers such as dioxane and tetrahydrofuran. The amount of reaction medium is immaterial as long as a sufficient amount is used to maintain the reaction in a liquid medium.

The process of this invention may be carried out at ambient temperatures, although a wide range of temperatures are operable.

In the practice of the method of this invention, the relative proportions of the two reactants, isoperthiocyanic acid and organic isocyanate, are about the stoichiometric ratio of 1:1.

The product of the initial stage of the reaction

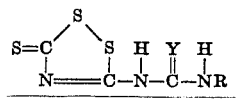

may be recovered by conventional means, e.g. precipitation and filtration, or other suitable methods dependent upon the physical properties of the product.

This invention is exemplified in the specific example described hereinbelow, which is understood to be an illustrative and not limitative embodiment of the invention.

EXAMPLE

Preparation of 3-phenylureido-5-thione 1,2,4-dithiazole

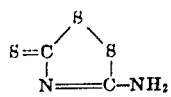
+ C₆H₅NCO → 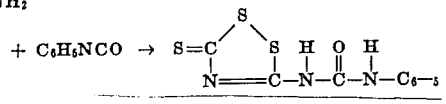

75.0 grams (0.50 mole) of isoperthiocyanic acid was suspended in 3 liters of dioxane. 59.5 grams (0.50 mole) of phenyl isocyanate was added to the foregoing suspension. The mixture was stirred and refluxed for 210 minutes. The precipitate a yellow solid was separated, washed with dioxane, and dried. The product 3-phenylureido-5-thione 1,2,4-dithiazole, exhibited a weight of 6.10 grams and a melting point of 220°–221° C.

The compounds of this invention are useful as peroxide inhibitors and as corrosion inhibitors. The corrosion inhibition tests were conducted using steel coupons, 3 inches by one-half inch, of 16 gauge steel. The steel coupons treated with the compounds of this invention showed no sign of corrosion or rust at the interface after 6 hours of exposure.

The compounds of this invention are also effective in inhibiting the formation of peroxides in ethers. Ethers effectively protected from peroxidation include tetrahydrofuran, tetrahydrofurfuryl ethyl ether, dihydropyran, tetrahydropyran, 2-methyltetrahydrofuran, 2-ethoxytetrahydropyran, and N-methylmorpholine.

Inasmuch as the foregoing specification comprises specific embodiments of the invention which were selected merely for purposes of illustration, it is to be understood that the invention includes all variations and modifications that may be made without departing from the scope as defined in the appended claims.

I claim:
1. Heterocyclic compounds of the formula

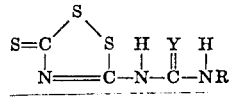

wherein Y is selected from the group consisting of oxygen and sulfur and R is hydrocarbon selected from the group consisting of alkyl of one to eight carbon atoms; phenyl; cycloalkyl selected from the group consisting of cyclopentyl, cyclohexyl, cycloheptyl, and cyclooctyl; benzyl; inertly substituted alkyls selected from the group consisting of 3-chloropropyl and 2-ethoxyethyl; inertly substituted alkenyls selected from the group consisting of 4-chlorobutyl, Y-phenylpropenyl, and chloroallyl; inertly substituted cycloalkyls selected from the group consisting of 4-methyl cyclohexyl and 4-chlorocyclohexyl; chlorophenyl; substituted aralkyl selected from the group consisting of chlorobenzyl, p-phenyl benzyl, p-methyl benzyl; and inertly substituted alkaryl selected from the group consisting of 3-chloro-5-methylphenyl, 2-6-di-tert-butyl-4-chlorophenyl.

2. The compound of the formula of claim 1 which is 3-phenylureido-5-thione 1,2,4-dithiazole.

* * * * *